Dec. 18, 1928.
J. J. LAWLER
1,695,809
AUTOMATIC HEAT CONTROLLING REGULATOR
Filed Aug. 13, 1925    2 Sheets-Sheet 1
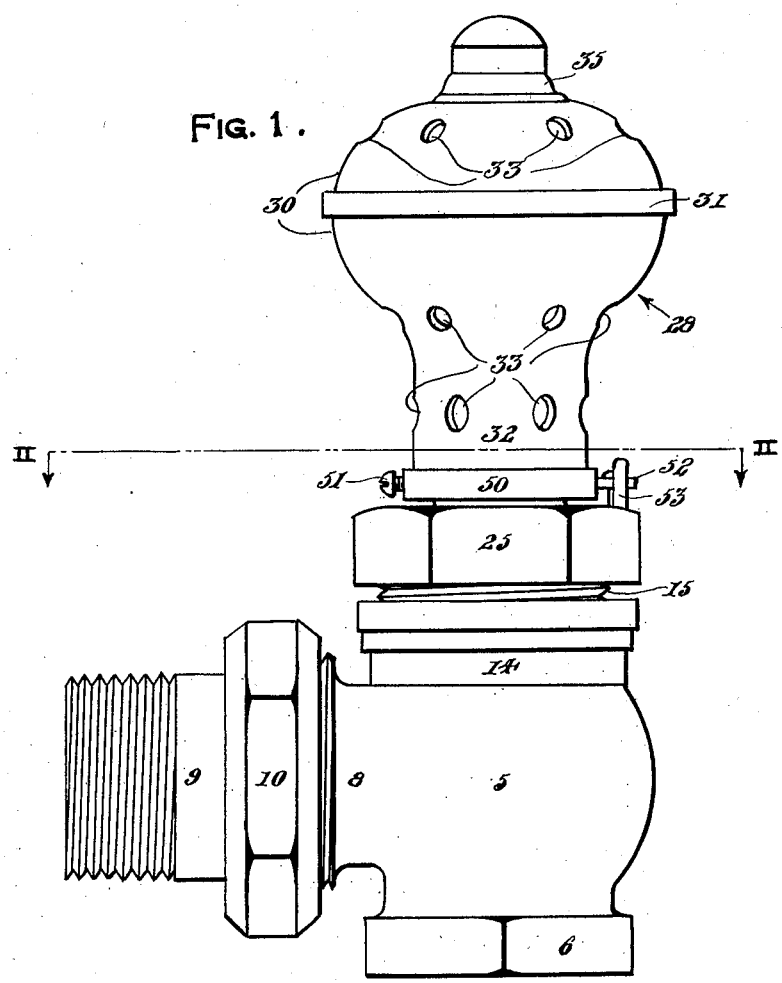
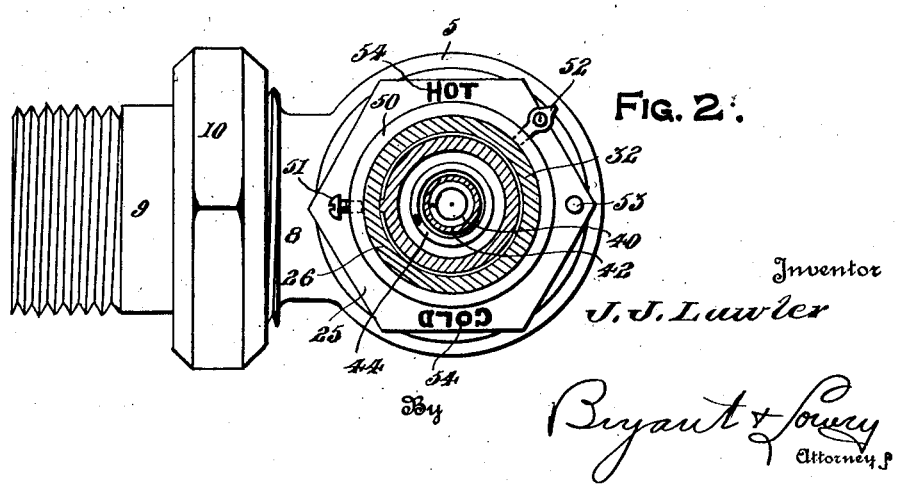
Inventor
J. J. Lawler
By Bryant & Lowry
Attorneys Dec. 18, 1928. 1,695,809
J. J. LAWLER
AUTOMATIC HEAT CONTROLLING REGULATOR
Filed Aug. 13, 1925 2 Sheets-Sheet 2

Inventor
J. J. Lawler
By Bryant & Lowry
Attorneys

Patented Dec. 18, 1928.

1,695,809

UNITED STATES PATENT OFFICE.

JAMES J. LAWLER, OF MOUNT VERNON, NEW YORK, ASSIGNOR TO DIRECT-CONTROL VALVE COMPANY, OF NEW YORK, N. Y., A CORPORATION OF DELAWARE.

AUTOMATIC HEAT-CONTROLLING REGULATOR.

Application filed August 13, 1925. Serial No. 50,032.

This invention relates to new and useful improvements in automatic heat controlling regulators.

It is the general object of the invention to provide an improved construction for thermostatic control valves such, for example, as employed to control flow of heating medium to radiators and embodying a construction and arrangement compact, simple and unitary in nature, in which the thermostatic element co-operates directly to control the valve member.

A further important object is to provide a thermostatic valve control unit which embodies a member functioning as a combined thermostatic element housing and regulator, and a valve operator.

Other objects and advantages of the invention will be apparent during the course of the following description.

In the accompanying drawings forming a part of this specification and in which like numerals are employed to designate like parts throughout the same, Figure 1 is a side elevational view of the structure embodying this invention, Figure 2 is a transverse sectional view taken on line 2—2 of Figure 1.

Figure 3:
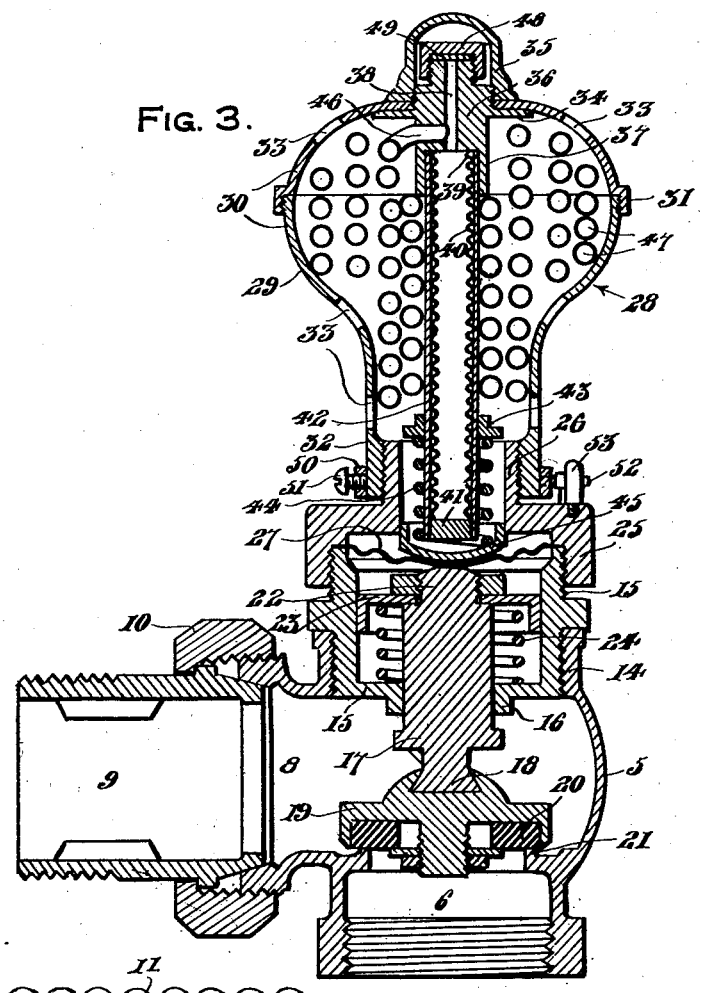
Figure 4:
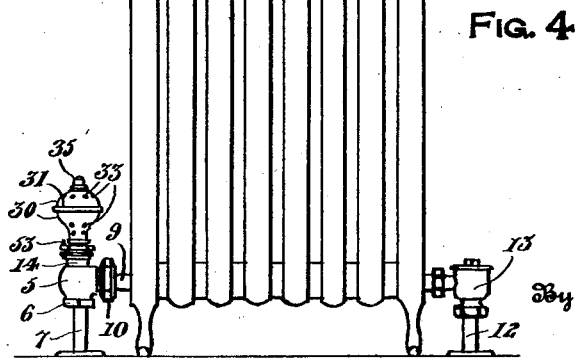

Figure 3 is a vertical sectional view of the entire device embodying this invention, and Figure 4 shows in side elevation the automatic heat controlling regulator properly applied to a radiator heating unit.

In the drawings, wherein for the purpose of illustration is shown a preferred embodiment of this invention, the numeral 5 designates a valve casing having an inlet opening 6 adapted to be connected to the service pipe 7, see Fig. 4, and further having an outlet opening 8 to which is connected a union 9 by the nut 10.

Figure 4 shows this union 9 properly connected to the lower portion of one end section of the radiator unit 11 which is further provided with an outlet pipe 12 having a radiator steam trap 13 suitably interposed therein.

The upper end 14 of the casing 5 is internally screw threaded for receiving the substantially cylindrical cage 15 having the flanged opening 16 in its bottom wall within which is slidably received the valve stem 17. This valve stem carries at its lower reduced end 18 the valve unit 19 which is provided with the compression washer 20 adapted to cooperate with the valve seat 21 formed at the entrance to the inlet opening 6. The upper reduced end 22 of the valve stem 17 has mounted thereon a spring retainer 23. Encircling the stem 17 and bearing at its opposite ends against the end wall of the cage 15 and the spring retainer 23 is a compression spring 24.

Threaded on the upper open end of the cage 15 is a cap 25 which is centrally apertured and formed with an upstanding tubular stem 26 that is externally screw threaded. This cap 25 clamps to the upper edge of the cage 15 a corrugated diaphragm 27 which prevents leakage of the heating medium from the valve casing 5.

Detachably connected to the stem 26 of the cap 25 is the thermostatic valve controlling unit which is designated in its entirety by the reference character 28. This unit includes a two part housing 29 which closely resembles in outline a door knob and is formed of the parts 30 which are threadedly connected at 31. This housing 29 is formed with the internally screw threaded stem portion 32 which is rotatably and consequently adjustably mounted upon the stem 26 of the cap 25. The parts 30 are provided with the circular series of apertures 33 which permit a circulation of heated air therethrough.

The outer end of the housing 29 is centrally apertured and has fastened thereto, as by the flange 34 and cap 35, a nipple 36. This nipple is formed with a tubular extension 37 which communicates with the bore 38 of the nipple and has suitably fastened to the inner end thereof the upper end 39 of the axially expansible thermostatic tube 40. The lower end of this tube is closed by the plug 41 which is suitably fastened to the tube 40 and also to the lower end of the guiding tube 42 which encircles the thermostatic tube 40. It will be noted that the lower ends of the tubes 40 and 42 project axially through the bore of the stem 26 carried by the valve cap 25.

Located a suitable distance from the lower end of the guiding tube 42, and sweated or otherwise fastened thereto is a ring 43 which has bearing thereagainst the upper end of a spring 44 that encircles the tube 42 and engages at its lower end the cup-like actuator 45. This actuator is held in engagement with the diaphragm 27 by the spring 44 and this diaphragm is flexed to cause the same to constantly bear against the upper end 22 of the valve stem 17.

The bore 38 of the nipple 36 is illustrated as having the end 46 of a tubular coil 47 communicating therewith, the said end being suitably fastened to the nipple 36. Figure 3 clearly shows this coil 47 as having its various convolutions suitably spaced throughout the interior of the housing 29. The free end of this coil 47, not shown, is not directly connected to any portion of the casing or its housed elements and is suitably closed or sealed to prevent the escape of the expansible fluid which is positioned within the coil and the tube 40 and is intended to entirely fill the same. For the purpose of permitting the fluid to be placed in this coil 47 and tube 40, the upper end of the bore 38 of the nipple 36 is closed by the threaded cap 48 which carries and forces against the upper end of the nipple a lead disk or washer 49.

Figures 1 to 3 inclusive show the stem portion 32 of the housing 29 as having a ring 50 fastened thereto by the set screw 51. This ring has projecting laterally therefrom a pointer 52 which cooperates with the stop pin 53 carried by the end wall of the cap 25. Figure 2 shows the end face of this top wall as having the indicia 54 stamped or otherwise displayed thereon.

The operation of this automatic heat controlling regulator may be described as follows: Figure 3 shows the valve 19 seated and it is understood that no heating medium will then be permitted to pass through the valve casing 5 into the radiator unit 11. To permit the heating medium to pass into the radiator, the housing 29 is rotated or adjusted upon the stem 26 of the cap 25 for causing the said housing to travel upwardly of the stem. This upward movement of the housing will remove the pressure of the spring 44 from the actuator 45 and the spring 24 in the cage 15 will unseat the valve 19. It will be understood that the housing 29 may be rotated a suitable distance to open the valve 19 to any desired degree. The passing of the heating medium into the radiator and the heating of the atmosphere surrounding the radiator will cause heated air to circulate through the apertures 33 of the housing 29 for heating the liquid in the coil 47 and expansible tube 40. If the temperature of the atmosphere surrounding the thermostatic coil and tube rises above a predetermined temperature, the fluid in the coil and tube will expand and the tube 40 will lengthen. This lengthening or axial expanding of the tube will cause the guiding tube 42 to move downwardly, due to its connection with the lower end of the thermostatic tube 40. This downward movement of the tube 42 will also move the collar 43 downwardly against the tension of the spring 44. The compressing of this spring will cause the actuator 45 to be moved downwardly for flexing the diaphragm 27 and moving the valve 19 by means of the stem 17 toward its seat 21. If the fluid expands to a suitable degree, the thermostatic tube 40 will lengthen sufficiently to entirely seat the valve 19.

It will now be seen that this thermostatic unit may be connected or disconnected with the valve casing by the tightening or untightening of its stem 32 upon the valve casing stem 26. The element 29 which heretofore has been described as a housing for confining the thermostatic unit also functions as a valve operator.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. In a device of the type described, a valve casing, a cage mounted in said casing, a reciprocating valve carried by the cage, a spring in the cage for opening the valve, a cap mounted on the cage and having a tubular stem in axial alinement with the valve, an actuator loosely positioned in the bore of the stem, and a thermostatic unit bodily adjustably carried by the stem on said cap in axial alinement with said valve and functioning when being adjusted, to seat the valve or permit the spring to unseat the valve, the unit automatically functioning to close the valve without being adjusted.

2. In a device of the type described, a valve casing, a spring opened reciprocating valve in the casing, a housing axially adjustably carried by the casing, a thermostatic element mounted within the housing in axial alinement with the valve, and a tensioned actuator interposed between the thermostatic element and the valve and movable independently thereof, whereby bodily adjustment of the housing will cause the valve to close or permit the spring to open the valve, and the thermostatic element will function to cause the actuator to close the valve independently of the adjustment of the housing.

3. In a device of the type described, a valve casing, a cage mounted in said casing, a reciprocating valve carried by the cage, a spring in the cage for opening the valve, a cap mounted on the cage and having a tubular stem in axial alinement with the valve, an actuator loosely positioned in the bore of the stem and engaging the valve, a housing threadedly adjustably connected to the tubular stem, a thermostatic element carried by the housing and positioned therein, and a yieldable connection between the thermostatic element and the actuator, whereby the valve may be opened or closed by adjusting the housing upon the tubular stem and wherein the thermosatic element will function to close the valve without the housing being adjusted.

4. In a device of the type described, a valve casing, a reciprocating valve in the casing, a spring for opening the valve, a knob like housing axially adjustably carried by the casing, an axially expansible thermostatic element carried by the housing and extending therethrough toward the valve in axial alinement therewith, a tensioned actuator interposed between the thermostatic element and the valve and movable independently thereof, and an expansible fluid in the thermostatic element, whereby the housing may be adjusted for closing or permitting the spring to open the valve and wherein the thermostatic unit will cause the actuator to close the valve when the fluid carried therein expands.

5. In a device of the type described, a valve casing, a cage mounted in said casing, a reciprocating valve carried by the cage, a spring in the cage for opening the valve, a cap mounted on the cage and having a tubular stem in axial alinement with the valve, an actuator loosely positioned in the bore of the stem, a knob like handle threadedly connected to the tubular stem, an axially expansible thermosatic tube connected to the outer end of the housing and extending therethrough to a point in close proximity to the actuator, a tubular coil communicating with the thermostatic tube and having its convolutions distributed in the interior of the housing and encircling the tube, and a yieldable connection between the thermostatic tube and the actuator, whereby the valve may be closed or opened by adjusting the housing and wherein expansion of the tube will close the valve without an adjustment of the housing.

6. In a device of the type described, a valve casing, a reciprocating valve in the casing, a spring for opening the valve, a housing threadedly connected to the casing, an axially expansible thermostatic tube connected at its outer end to the housing and approaching the valve, a guiding tube encircling the thermostatic tube and connected at its free end to the latter, a collar fixed to the tube encirling the thermostatic tube, and a spring interposed between the collar and the valve, whereby the housing may be adjusted for opening or closing the valve and wherein the axial expansion of said thermostatic tube will cause the valve to be closed without an adjustment of the housing.

7. In an automatic temperature control device, in combination, a valve, having a casing, and connected with a conduit for controlling passage of a temperature changing fluid, a thermostat housing bodily adjustably carried by said casing, an axially expansible thermostatic element firmly connected to said thermostat housing for bodily movement therewith as a unit when the support is adjusted in either direction, and being positioned in axial alignment with said valve and having operative connection therewith, to control the valve upon adjustment of said support, or to control it thermostatically, and a tubular guiding member surrounding said thermostatic element so as to cooperate with the exterior surface of the latter and being positioned within said housing.

8. In an automatic temperature control device, in combination, a spring biased valve, having a casing, and connected with a conduit for controlling passage of a temperature changing fluid, a thermostat support bodily adjustably carried by said casing, an axially expansible thermostatic element firmly connected to said thermostat support for bodily movement therewith as a unit when the support is adjusted in either direction, and being positioned in axial alignment with said valve and having operative connection therewith to control the valve upon adjustment of said support, or to control it thermostatically, and a guiding tube for said thermostatic element, slidably connected at one end to the thermostat support, and connected near its opposite end to said thermostatic element.

9. In an automatic temperature control device, in combination, a valve having a casing and connected in a conduit for controlling passage of a temperature changing fluid, a thermostat support carried by said casing, an axially expansible thermostatic element carried by said thermostat support, and a guiding member for said thermostatic element movable with said thermostatic element upon expansion or contraction thereof and having adjustable connection with said thermostat support automatically adjustable by expansion or contraction of said thermostatic element.

10. In an automatic temperature control device, in combination, a spring biased valve, having a casing, and connected with a conduit for controlling passage of a temperature changing fluid, a thermostat support bodily adjustably carried by said casing, and an axially expansible thermostatic element firmly connected to said thermostat support for bodily movement therewith as a unit when the support is adjusted in either direction, and being positioned in axial alignment with said valve and having operative connection therewith, to control the valve upon adjustment of said support, or to control it thermostatically, a guiding tube for said thermostatic element, slidably connected at one end to the thermostat support, and connected near its opposite end to said thermostatic element, and a valve actuator yieldable connected to said guiding tube.

11. In a device of the type described, in combination, a thermostat support, an axially expansible thermostatic element attached to and carried by said support in operative position, and a guiding member for said thermostatic element, said guiding member having operative connection with said thermostatic element and having an adjustable connection with said thermostatic support adjustable upon an expansion or contraction of said thermostatic element.

12. In a device of the type described, in combination, a thermostat support, an axially expansible thermostatic element attached to and carried by said support in operative position, and a guiding member for said thermostatic element, movably connected to said thermostat support adjacent to the attachment of the thermostatic element thereto and having a distant attachment with said thermostatic element.

13. In a device of the type described, in combination, a valve, a thermostat support adjustable relatively to the valve, an axially expansible tubular thermostatic element carried by said support in operative position relative to said valve, and a guiding member for said thermostatic element contacting with the outside thereof and operatively connected to said thermostatic element and movable thereby upon axial expansion or contraction thereof, and also movable upon adjustment of the support.

In testimony whereof I affix my signature.

JAMES J. LAWLER.